United States Patent
Tassy et al.

(10) Patent No.: US 9,855,891 B2
(45) Date of Patent: Jan. 2, 2018

(54) REMOVABLE ELECTRICAL DEVICE FOR A MOTOR VEHICLE

(71) Applicant: Valeo Vision, Bobigny (FR)

(72) Inventors: Pierre Louis Tassy, Asnieres sur Seine (FR); Christophe Dubosc, Villemomble (FR); Nirina Rasoldier, Cachan (FR); Maxime Briand, Change (FR)

(73) Assignee: VALEO VISION, Bobigny (FR)

( * ) Notice: Subject to any disclaimer, the term of this patent is extended or adjusted under 35 U.S.C. 154(b) by 168 days.

(21) Appl. No.: 14/869,100

(22) Filed: Sep. 29, 2015

(65) Prior Publication Data

US 2016/0096471 A1    Apr. 7, 2016

(30) Foreign Application Priority Data

Oct. 1, 2014 (FR) .................................. 14 59392

(51) Int. Cl.
*B60Q 3/62* (2017.01)
*F21L 4/08* (2006.01)
*B60Q 3/74* (2017.01)
*B60Q 3/88* (2017.01)
*B60Q 3/59* (2017.01)

(52) U.S. Cl.
CPC ............... *B60Q 3/62* (2017.02); *B60Q 3/59* (2017.02); *B60Q 3/74* (2017.02); *B60Q 3/88* (2017.02); *F21L 4/085* (2013.01)

(58) Field of Classification Search
CPC ......... B60Q 3/0269; B60Q 3/62; B60Q 3/88; B60Q 3/74; F21L 4/085

USPC ......................... 362/486, 488, 190, 191, 192
See application file for complete search history.

(56) References Cited

U.S. PATENT DOCUMENTS

| | | | |
|---|---|---|---|
| 3,825,740 A | 7/1974 | Friedman et al. | |
| 5,010,454 A * | 4/1991 | Hopper | B60Q 7/00 362/183 |
| 5,077,643 A * | 12/1991 | Leach | B60Q 1/323 362/155 |
| 5,673,989 A * | 10/1997 | Gohl | B60Q 1/076 362/286 |
| 5,908,233 A * | 6/1999 | Heskett | H02J 7/0042 320/107 |
| 6,079,858 A * | 6/2000 | Hicks | B60R 1/1207 362/276 |
| 6,179,431 B1 | 1/2001 | Chien | |
| 6,231,219 B1 * | 5/2001 | Lohss | B60Q 7/00 362/191 |
| 8,714,791 B2 | 5/2014 | Ahn et al. | |

(Continued)

FOREIGN PATENT DOCUMENTS

DE   2723096 A1   11/1978
DE   3624367 A1   1/1988

(Continued)

*Primary Examiner* — Laura Tso

(74) *Attorney, Agent, or Firm* — Oblon, McClelland, Maier & Neustadt, L.L.P.

(57) ABSTRACT

A removable electrical device for a motor vehicle, which is insertable into a recess in the passenger compartment of the motor vehicle, where its battery is rechargeable, the removable electrical device comprising an indicator light which constitutes a charge indicator of the battery in the daytime and an ambient lighting element for the passenger compartment of the vehicle at nighttime.

21 Claims, 2 Drawing Sheets

(56) References Cited

U.S. PATENT DOCUMENTS

| | | | |
|---|---|---|---|
| 2003/0031023 A1* | 2/2003 | Hutzel | B60Q 1/2665 |
| | | | 362/494 |
| 2007/0139916 A1 | 6/2007 | Vermillion et al. | |
| 2013/0155659 A1 | 6/2013 | Ahn et al. | |
| 2015/0049500 A1 | 2/2015 | Sakarian et al. | |

FOREIGN PATENT DOCUMENTS

| | | |
|---|---|---|
| DE | 202014103514 U1 | 9/2014 |
| FR | 3001672 A1 | 8/2014 |
| WO | 8703354 A1 | 6/1987 |

\* cited by examiner

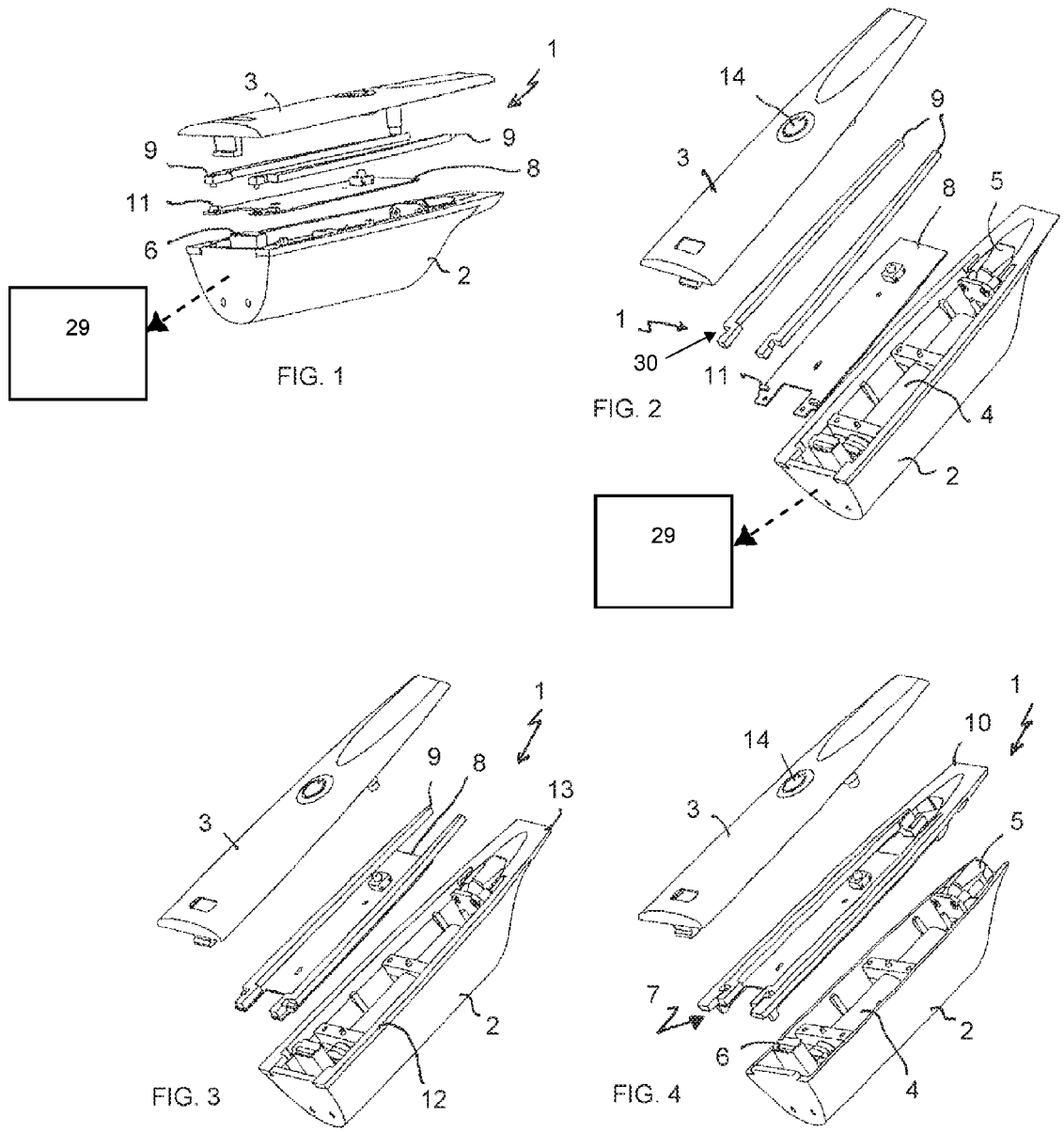

REMOVABLE ELECTRICAL DEVICE FOR A MOTOR VEHICLE

CROSS-REFERENCE TO RELATED APPLICATIONS

This application claims priority to the French application 1459392 filed on Oct. 1, 2014, which application is incorporated herein by reference and made a part hereof.

BACKGROUND OF THE INVENTION

1. Field of the Invention

The invention relates to a removable electrical device for a motor vehicle, and more particularly to such an electrical device equipped with a charge indicator.

2. Description of the Related Art

Document U.S. Patent Application 2013/0155659, which is now issued as U.S. Pat. No. 8,714,791, describes a removable flashlight, the battery of which is recharged when the flashlight is on its support.

Document FR 3 001 672 describes a removable flashlight in the form of an assist grip in the passenger compartment of a motor vehicle. This flashlight is equipped with an auxiliary light source which can be controlled so as to light the passenger compartment.

The flashlights of the prior art do not comprise a charge indicator.

SUMMARY OF THE INVENTION

A first aim of the invention is to propose a removable electrical device for a motor vehicle, comprising a charge indicator.

Another aim of the invention is to propose a removable electrical device for a motor vehicle, comprising a charge indicator light that is not in the form of a point, with a limited space requirement.

Another aim of the invention is to propose a removable electrical device for a motor vehicle, comprising a charge indicator light that is able to differentiate between a number of states of charge in different configurations.

The subject of the invention is a removable electrical device for a motor vehicle, which is insertable into a recess in the passenger compartment of the motor vehicle, where its battery is rechargeable, the electrical device comprising an indicator light, wherein the indicator light constitutes a charge indicator of the battery in the daytime and an ambient lighting element for the passenger compartment of the vehicle at nighttime.

Advantageously, the electrical device comprises a control unit that is able to control the light emission by the indicator light depending on whether it is daytime or nighttime and optionally depending on the state of charge of the battery and/or on the position of the electrical device with respect to its recess.

For example, the control unit can be designed to adapt the color of the indicator light depending on the state of charge of the battery when the indicator light functions as a charge indicator and when the electrical device is fitted in its recess.

According to another example, the control unit can be designed to control the indicator light such that it permanently emits light when the indicator is fitted in its recess and functions as an ambient lighting element.

Optionally, the control unit is designed to control the indicator light such that it emits light in a pulsed form when the indicator is out of its recess and when the battery has a state of charge below a predetermined threshold value.

Advantageously, the electrical device comprises a subassembly comprising a light source that is able to emit light and an outlet screen for the light emitted by the light source, the outlet screen being transparent or translucent and constituting the indicator light. According to one embodiment of the invention, the electrical device comprises a housing and a cover, the subassembly being arranged between the housing and the cover such that the outlet screen is visible at the sides.

Advantageously, the outlet screen is a diffusing screen, made of transparent material provided with graining, or made of diffusing material.

Advantageously, the subassembly comprises a printed circuit support carrying at least one light guide and the outlet screen. If need be, the light guide is designed to guide the light emitted by the light source, by total internal reflection, to the outlet screen.

Advantageously, the printed circuit support carries the light source, this light source being an RGB LED.

Advantageously, the printed circuit support carries the light source, this light source being a side-emitting LED.

Advantageously, a light guide is in the form of a chopstick and has an indentation that is able to receive the light emitted by the light source.

Advantageously, the outlet screen has two side arms which each externally border one of the light guides.

Advantageously, the outlet screen has a front part which on the one hand provides the mechanical connection to the side arms and on the other hand locks the subassembly in an axial position with respect to a housing.

Advantageously, each of the side arms of the outlet screen constitutes the indicator light.

Advantageously, the indicator light is a line of light.

Advantageously, the removable electrical device comprises a light source that is electrically connected to the battery and is able to emit light when it is powered by the battery, such that the removable electrical device is a flashlight.

Further features and advantages of the invention will become apparent from the following description, given with reference to the appended drawings, in which:

BRIEF DESCRIPTION OF THE ACCOMPANYING DRAWINGS

FIG. 1 is an exploded view of an exemplary embodiment of the removable electrical device according to the invention, in the form of a removable flashlight;

FIG. 2 is an exploded view, from a different angle, of the removable flashlight in FIG. 1;

FIG. 3 is an exploded view, similar to FIG. 2, showing the assembly of the light guides and the printed circuit support;

FIG. 4 is an exploded view, similar to FIG. 3, showing the assembly of the outlet screen with the light guides and the printed circuit support;

DETAILED DESCRIPTION OF THE PREFERRED EMBODIMENTS

Figure 5:
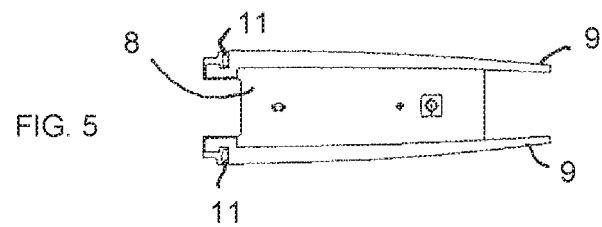
FIG. 5 is a top view of the assembly of the light guides and the printed circuit support.

A removable electrical device 1 (FIGS. 1, 2, 3, 4 and 8), denoted removable flashlight 1 in the following text, is in the form of a housing 2 (FIGS. 1, 2, 3, 4 and 8), which is closed by a cover 3 (FIGS. 1, 2, 3, 4 and 8), and is insertable into a recess 29 (illustrated schematically in FIGS. 1 and 2) in the passenger compartment of a vehicle. In this recess 29, the removable flashlight 1 is connected to a charging circuit for a battery 4 (FIGS. 1, 2, 3, 4 and 8), housed in the housing 2. The housing 2 comprises the usual components of a flashlight and in particular a front illumination lamp 5 (FIGS. 2, 4 and 8) of the LED type. In the exemplary embodiment shown, the housing 2 comprises a connector 6 (FIGS. 4, 5 and 8) for a USB plug.

Figure 8:
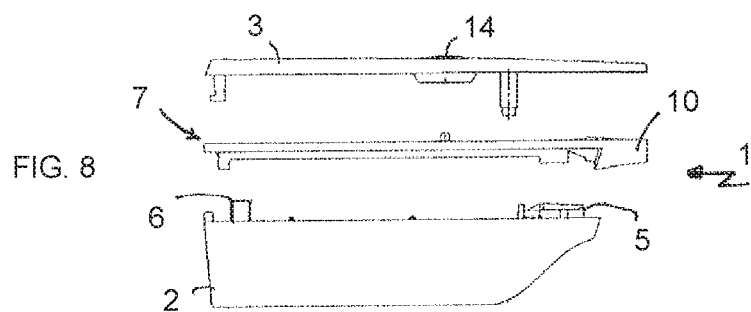
FIG. 8 is an exploded front view of the removable flashlight in FIG. 4.
Figure 7:
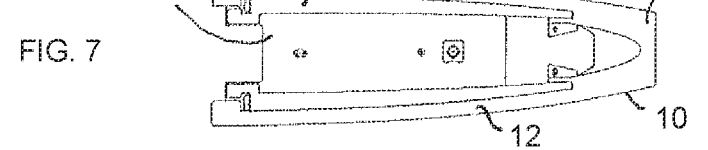
FIG. 7 is a top view of the subassembly of the outlet screen, the light guides and the printed circuit support.
Figure 6:
FIG. 6 is a front view of the assembly in FIG. 5.

Disposed at the top of the housing 2, under the cover 3, is a substantially flat subassembly 7 (FIGS. 4, 7 and 8) having the function of an indicator light. This subassembly 7 consists of a printed circuit support 8 (FIGS. 1, 2, 3, 5, 6 and 7), light guides 9 (FIGS. 1, 2, 3, 5, 6 and 7) and an outlet screen 10 (FIGS. 4, 7 and 8). In the exemplary embodiment shown, the printed circuit support 8 carries, in its rear part, two side-emitting RGB LEDs, that is to say two LEDs that emit light colored on the basis of red (R), green (G) and blue (B), with emission parallel to the plane of the printed circuit support 8. These two RGB LEDs bear the reference 11 (FIGS. 1, 2 and 5) and protrude from the printed circuit support 8.

The two light guides 9 are made of transparent material with, preferably prismatic, decoupling elements, or made of diffusing material.

They are in the form of chopsticks with an indentation 30 at the rear that is able to receive an RGB LED 11.

Thus, each light guide 9 bears at the rear against an RGB LED 11 and extends along, and beyond, the printed circuit support 8.

The outlet screen 10 has two side arms 12 (FIGS. 3 and 7) and a front part 13 (FIG. 7). The side arms 12 each externally border the light guide 9.

The front part 13 on the one hand provides the mechanical connection between the side arms 12 and on the other hand locks the subassembly 7 in an axial position with respect to the housing 2, by virtue of bearing at the front against the housing 2.

The outlet screen 10 is housed between the housing 2 and the cover 3, and is visible at the sides when the cover 3 is fixed to the housing 2.

This outlet screen 10 is made of transparent material with surface graining, or of diffusing material such that the outlet screen 10 is a diffusing screen. It is in lateral contact with the light guides 9, which are themselves in contact with the RGB LEDs 11. Thus, when the RGB LEDs 11 are emitting light, the outlet screen 10 makes a line of light visible from the outside, by way of each of its side arms 12, on each side of the housing 2.

The removable flashlight 1 according to the invention functions as follows, the removable flashlight 1 being presumed to be initially in its recess 29, in the passenger compartment of the vehicle, and the battery 4 fully charged. Under these circumstances, at nighttime, the removable flashlight 1 is involved in the ambient lighting of the vehicle, and the outlet screen 10 constitutes a discreet line of light.

During the daytime, the line of lights constitutes a charge indicator of the battery 4. The line of light is green when the battery 4 is fully charged, and it is orange when the battery 4 is being charged.

When the removable flashlight 1 is removed from its recess 29 in the passenger compartment, pressure on a control button 14 (FIGS. 2, 4 and 8) of the cover 3 allows it to function as a flashlight. When the battery is low, the line of light at the outlet screen 10 becomes red and flashes, drawing attention to the need to put the flashlight back on charge in its recess 29.

According to one feature of the invention, the passage from daytime to nighttime, which is automatically carried out by the vehicle, causes automatic adaptation of the state of the line of light at the outlet screen 10. Thus, the removable flashlight 1 of the motor vehicle comprises, with the line of light at the outlet screen 10, an indicator light that constitutes, during the daytime, a charge indicator of the battery of the removable flashlight 1, and at nighttime, an ambient lighting element of the passenger compartment of the vehicle.

Preferably, the electrical device or removable flashlight 1 comprises a control unit which is housed in the housing 2 and is able to control the emission of light from the indicator light depending on whether it is daytime or nighttime, and optionally depending on the state of charge of the battery 4 and/or on the position of the electrical device or removable flashlight 1 with respect to its recess 29.

In one exemplary embodiment, when the electrical device or removable flashlight 1 is in its recess 29 at nighttime, the control unit controls the permanent emission of light by the indicator light in order to ensure ambient lighting.

During the daytime, when the electrical device or removable flashlight 1 is in its recess 29, the control unit controls the permanent emission of light by the indicator light depending on the state of charge of the battery 4: the color green for the charged battery 4, and orange for the battery 4 being charged.

When the electrical device or removable flashlight 1 is out of its recess 29 at nighttime, the control unit controls the emission of light, preferably red, in a pulsed form, by the indicator light, when the state of charge of the battery 4 drops below a predetermined threshold value.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A removable electrical device for a motor vehicle, said removable electrical device being insertable into a recess in a passenger compartment of said motor vehicle, a battery that is rechargeable, said removable electrical device comprising an indicator light, wherein said indicator light constitutes a charge indicator of said battery in daytime and an ambient lighting element for said passenger compartment of said motor vehicle at nighttime, and in that it comprises a control unit that is able to control the light emission by said indicator light depending on whether it is daytime or nighttime and also depending on at least one of the state of charge of said battery or a position of said removable electrical device with respect to said recess.

2. The removable electrical device according to claim 1, wherein said removable electrical device comprises a subassembly comprising a light source that is able to emit light and an outlet screen for the light emitted by said light source, said outlet screen being transparent or translucent and constituting said indicator light.

3. The removable electrical device according to claim 2, wherein said outlet screen is a diffusing screen.

4. The removable electrical device according to claim 3, wherein said outlet screen is made of a transparent material provided with graining.

5. The removable electrical device according to claim 3, wherein said outlet screen is made of a diffusing material.

6. The removable electrical device according to claim 2, wherein said subassembly comprises a printed circuit support, said outlet screen and at least one light guide being mounted on said printed circuit support.

7. The removable electrical device according to claim 6, wherein said light source is mounted on said printed circuit support, said light source being an RGB LED.

8. The removable electrical device according to claim 6, wherein said light source is mounted on said printed circuit support, said light source being a side-emitting LED.

9. The removable electrical device according to claim 6, wherein said at least one light guide comprises two elongated light guides and has at least one indentation that is able to receive the light emitted by said light source.

10. The removable electrical device according to claim 2, wherein said subassembly comprises at least two light sources and two light guides, and in that said outlet screen has two side arms which each externally border said at least one light guide.

11. The removable electrical device according to claim 10, wherein said outlet screen has a front part which provides a mechanical connection to said two side arms and locks said subassembly in an axial position with respect to a housing.

12. The removable electrical device according to claim 10, wherein each of said two side arms of said outlet screen constitutes said indicator light.

13. The removable electrical device according to claim 1, wherein said indicator light defines a line of light.

14. The removable electrical device according to claim 1, wherein said removable electrical device comprises a light source that is electrically connected to said battery and is able to emit light when it is powered by said battery, such that said removable electrical device is a flashlight.

15. The removable electrical device according to claim 3, wherein said subassembly comprises a printed circuit support, said outlet screen and at least one light guide being mounted on said printed circuit support.

16. The removable electrical device according to claim 4, wherein said subassembly comprises a printed circuit support, said outlet screen and at least one light guide being mounted on said printed circuit support.

17. The removable electrical device according to claim 5, wherein said subassembly comprises a printed circuit support, said outlet screen and at least one light guide being mounted on said printed circuit support.

18. The removable electrical device according to claim 7, wherein said light source is mounted on said printed circuit support, said light source being a side-emitting LED.

19. The removable electrical device according to claim 7, wherein said at least one light guide comprises two elongated light guides and has an indentation that is able to receive the light emitted by said light source.

20. The removable electrical device according to claim 8, wherein said at least one light guide comprises two elongated light guides and has an indentation that is able to receive the light emitted by said light source.

21. The removable electrical device according to claim 11, wherein each of said two side arms of said outlet screen constitutes said indicator light.

* * * * *